United States Patent [19]
Elliott et al.

[11] Patent Number: 5,749,388
[45] Date of Patent: May 12, 1998

[54] METHOD AND CIRCUIT FOR INCREASING THE LIFE OF SOLENOID VALVES

[75] Inventors: Robert S. Elliott, Stevensville, Mich.; Luca Frasnetti, Cunardo, Italy

[73] Assignee: Whirlpool Europe B.V., Veldhoven, Netherlands

[21] Appl. No.: 708,157

[22] Filed: Aug. 27, 1996

[30] Foreign Application Priority Data

Sep. 1, 1995 [IT] Italy ................................ MI95A1856

[51] Int. Cl.⁶ .................................................. F16K 31/06
[52] U.S. Cl. .................. 137/1; 251/129.01; 251/129.15; 251/64
[58] Field of Search .................. 251/129.15, 129.05, 251/129.01, 64; 335/277, 271, 257; 137/1

[56] References Cited

U.S. PATENT DOCUMENTS

| | | |
|---|---|---|
| 3,476,128 | 11/1969 | Barker . |
| 3,523,676 | 8/1970 | Barker . |
| 3,949,964 | 4/1976 | Freeman . |
| 4,531,708 | 7/1985 | Livet . |
| 4,794,890 | 1/1989 | Rocheson, Jr. .................... 251/64 X |
| 4,813,443 | 3/1989 | Pounder ...................... 251/129.05 X |
| 4,878,650 | 11/1989 | Daly et al. ...................... 251/129.15 |
| 5,427,352 | 6/1995 | Brehm ........................................ 251/64 |

FOREIGN PATENT DOCUMENTS 95117831  4/1996  European Pat. Off. .

OTHER PUBLICATIONS

Vol. 7, No.5, (M–184) [1150] Patent Abstract Jan. 1983 Japan.

*Primary Examiner*—Kevin Lee
*Attorney, Agent, or Firm*—Thomas A. Schwyn; Joel M. Van Winkle; Robert O. Rice

[57] ABSTRACT

The method provides for applying to the solenoid valve, during its movement of closure by the action of a spring, a voltage signal the purpose of which is to brake this closure movement. The circuit comprises a static switch connected between the coil of the solenoid valve and earth, and an intermediate tap between these two components from which a voltage signal is withdrawn and is transformed by a microcontroller into a control signal for the static switch, such as to apply the braking signal to the solenoid valve.

9 Claims, 2 Drawing Sheets

5,749,388

1

METHOD AND CIRCUIT FOR INCREASING THE LIFE OF SOLENOID VALVES

BACKGROUND OF THE INVENTION

1. Field of the Invention

This invention relates to a method for prolonging the useful life of solenoid valves used for fluid flow shutoff and comprising a coil, and a mobile core loaded by a return spring and presenting a valving member formed from an elastomer. The invention also relates to a circuit for implementing the method.

2. Description of the Related Art

Solenoid valves are two-state (open/closed) shutoff devices and can be represented schematically as shown in section in FIG. 1, in which the reference numeral 1 indicates the valve body provided with an inlet 2 and an outlet 3. The body 1 comprises a valve seat 4 to be intercepted by a valving member 5 of elastomeric material. This valving member is rigid with a mobile core 6 on which in one direction a return spring 7 acts to move the valving member 5 onto the valve seat 4 and obtain the "closed" state, and in the other direction a coil 7A in which the mobile core is movably mounted acts to obtain the "open" state when said coil is energized. In some cases a fixed core is also provided.

When the coil 7A is de-energized, the spring 7 urges the valving member 5 violently against the valve seat 4. During this stage the valving member 5 absorbs all the kinetic energy possessed by the mobile core 6 as a result of the thrust of the spring 7, the impact of the valving member 5 against the valve seat 5 being such as to cause permanent deformation of the elastomeric material with the passage of time, to the extent of limiting the useful life of the valve especially in those cases in which the valve is used in applications in which frequent change-over is required (for example when the valve is used to control a fluid flow rate by a pulse-duration modulation control signal).

SUMMARY OF THE INVENTION

The main object of the present invention is to provide a method and circuit enabling the useful life of a solenoid valve to be increased by reducing the kinetic energy with which the valving member reaches the valve seat.

This and further objects which will more apparent from the ensuing detailed description are attained by a method and circuit arrangement the inventive aspects of which are defined in the accompanying claims.

BRIEF DESCRIPTION OF THE DRAWINGS

The invention will be more apparent from the detailed description of a preferred embodiment thereof given hereinafter by way of non-limiting example and illustrated on the accompanying drawing, in which.

2

DESCRIPTION OF THE PREFERRED EMBODIMENT

Figure 1:
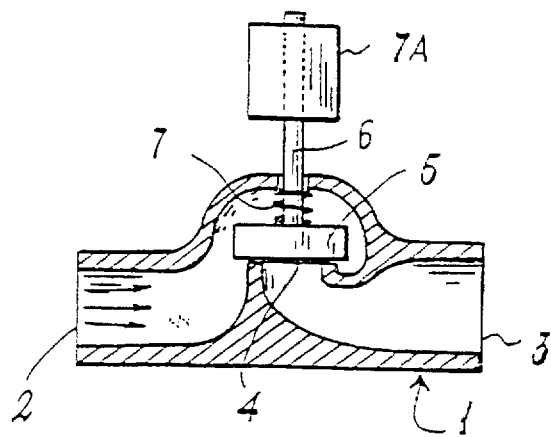
FIG. 1 is a schematic section through a known solenoid valve.
Figure 2:
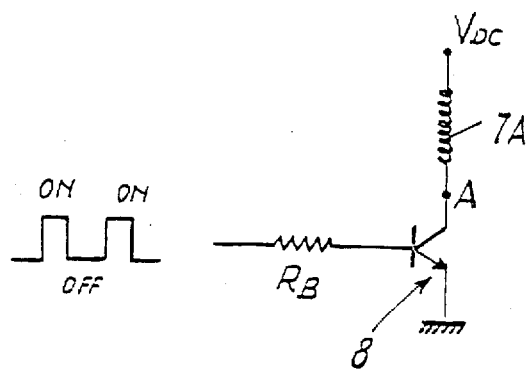
FIG. 2 is a schematic representation of a conventional control circuit for the solenoid valve.

With reference to FIG. 2, the coil 7 of the solenoid valve is connected to a d.c. voltage source VDC and in series with a static switch 8 represented by way of example as a transistor with its emitter connected to earth. The base of the transistor 8 is connected via a resistor RB to a source (not shown) of ON (valve open) and OFF (valve closed) control signals.

Figure 3:
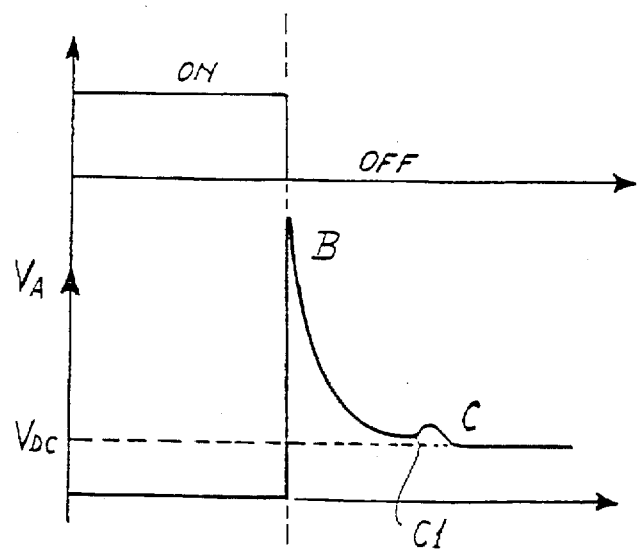
FIG. 3 shows two curves relative to the passage of the solenoid valve from the "open" state to the "closed" state.

If the voltage at the point A (at which the coil 7A is connected to the transistor 8) is monitored, this voltage being complementary to that applied across the coil, the signals obtained during its de-energization, in which the control signal passes from the ON state to the OFF state, vary with time as shown in FIG. 3, in which the upper signal represents the control signal and the lower signal represents the voltage $V_A$ (measured at the point A). As can be seen from the diagrams, the passage of the control signal from the ON state to the OFF state, ie the action which provides corresponding closure of the solenoid valve, is characterised by a voltage at the point A in which the two distinct moments, typical of time-variable inductors, can be recognized, these being described by the equation:

$$V(t) = L(t)\frac{di}{dt} + \frac{dL}{dt} i(t)$$

The first $V_A$ peak, of high value indicated by B, is represented by the first term of the equation and relates in practice to the discharge of the inductor (coil+cores). The second peak of much lower value (indicated by C), relates to the change in the inductance of the coil+core assembly due to the movement of the mobile core.

Figure 4:
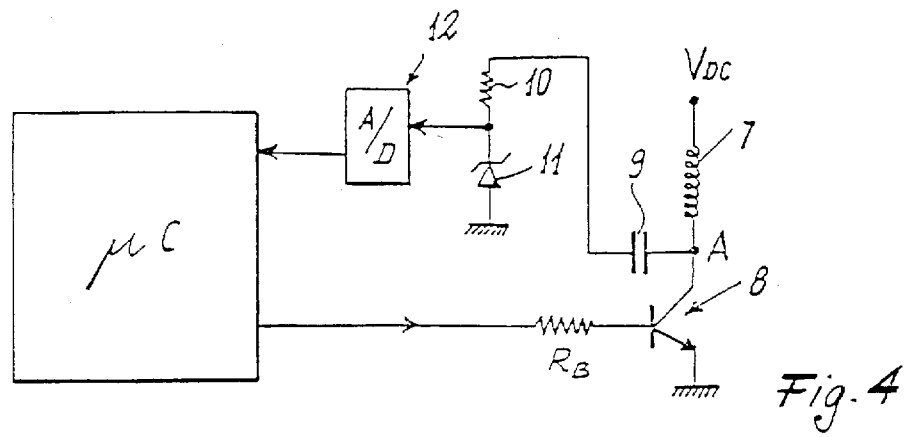
FIG. 4 shows one embodiment of the circuit arrangement of the invention.

According to the invention, the moment of initiation (point $C_1$) of this second peak C is indicative of the commencement of movement of the mobile core 6 (and relative valving member 5), and is used as a synchronization signal to initiate an operation for damping the impact of the valving member 5 against the valve seat 4, using for this purpose a suitable control circuit, for example a microcontroller μC within the circuit arrangement shown in FIG. 4. In this circuit arrangement, the voltage signal is taken from the point A and fed back to the microcontroller μC via a capacitor 9, a resistor 10, a Zener diode 11 and a converter.

As its first operation, the microcontroller μC (by means of the program implemented within it and the signal reaching it from A) identifies the moment in which the movement of the mobile core 6 commences. This identification is achieved by analyzing the first derivative of the feedback signal. As can be seen from FIG. 3, the moment of commencement (point $C_1$) of the movement is characterised by a sign reversal of the first derivative and a consequent relative minimum. Having identified this moment, the microcontroller μC counts a given delay and applies to the transistor 8, on expiry of this delay, an ON control signal (solenoid valve powered) of predetermined duration, to determine a counteracting action to the force provided by 7, for example a braking action, which acts on the mobile core 6 while moving, hence achieving a substantially less violent impact of the valving member 5 against the valve seat 4.

The extent of the delay and the duration of the braking pulse (and hence the quantity of energy counteracting the kinetic energy of the mobile core while in movement) depend on the type of valve (they being a function of the mass of the mobile core, the elastic constant of the spring, the particular mechanical construction and the friction deriving from it), and are determined preferably experimentally on a sample solenoid valve by known means.

Figure 5:
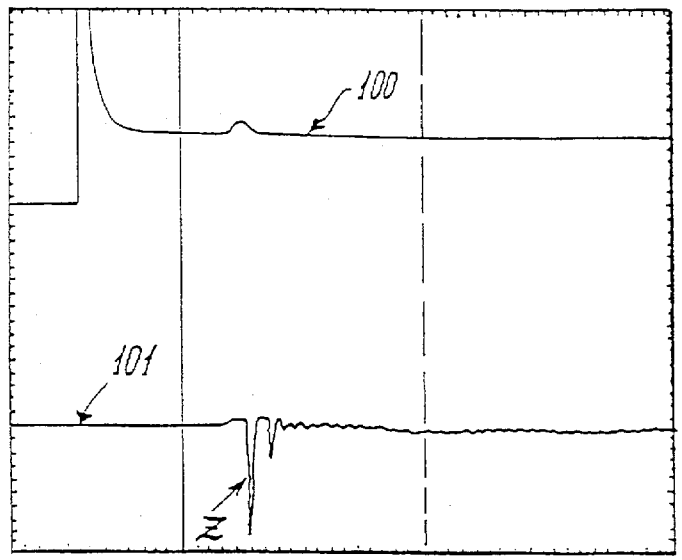
FIGS. 5 and 6 show respectively operating diagrams relative to a traditionally controlled solenoid valve and a solenoid valve controlled in accordance with the teachings of the invention.

In FIG. 5, the curve 100 obtained experimentally on the circuit of FIG. 2 corresponds to that of FIG. 3 and hence to the variation in the voltage at A on passage from valve open to valve closed, whereas the curve 101 represents the signal read by an accelerometer positioned on the valve body 1 (the acceleration of the body is related by reaction to the movement of the mobile core within it). The curve 101 also relates to the circuit arrangement of FIG. 2.

Figure 6:
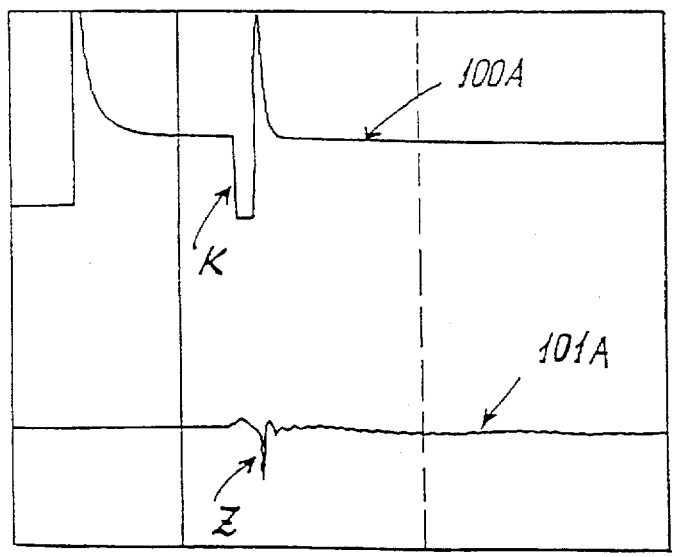

The curve 100A of FIG. 6 represents the variation of the voltage at point A with time within the circuit arrangement of FIG. 4. In the curve 100A the part K relates to the braking signal. The curve 101A represents the accelerometric signal in the circuit arrangement of FIG. 4.

As can be seen by comparing the curves 101 and 101A of FIGS. 5 and 6, the acceleration of the valve body 1 following impact of the mobile core (5, 6) is approximately halved by the action of the braking signal (see peaks Z on the two curves).

We claim:

1. A method for prolonging the useful life of solenoid valves used for fluid flow shutoff, the solenoid valve comprising a coil, a body provided with a valve seat, and a mobile core loaded by a return spring and presenting a valving member formed from an elastomer and arranged to cooperate with the valve seat of said body, the method comprising:

energizing the coil during the closure stroke of the mobile core for applying a braking force to the mobile core for counteracting the bias provided by the return spring while the mobile core is moving towards the valve seat such that the energy involved in the impact between the valving member and the mobile core seat is reduced.

2. A method as claimed in claim 1, wherein the energization of the coil for braking the mobile core occurs with a delay from the commencement of movement of the mobile core and has a predetermined duration.

3. A method as claimed in claim 2, wherein a feedback signal containing information on the commencement of movement of the mobile core is used in controlling the braking force.

4. A control system for a solenoid valve for applying a braking force to the solenoid valve during its closure stroke for prolonging the useful life of the solenoid valve, the solenoid valve includes a coil, a body provided with a valve seat, and a mobile core loaded by a return spring and presenting a valving member formed from an elastomer and arranged to cooperate with the valve seat of said body, the control system comprising:

a microcontroller means for controlling the state and movement of the solenoid valve, a static switch connected in series with the coil of the solenoid valve, and a feedback line to the microcontroller means connected between the static switch and the coil for providing a voltage signal to the microcontroller means, wherein in response to the voltage signal on the feedback line, the microcontroller means energizes the coil during the closure stroke of the mobile core.

5. The control system according to claim 4, further wherein the microcontroller means energizes the coil for braking the mobile core in response to sensing the commencement of movement of the mobile core during its closure stoke.

6. The control system according to claim 5, further wherein the microcontroller means energizes the coil for braking the mobile core after counting a delay from the commencement of movement of the mobile core.

7. A method for prolonging the useful life of a solenoid valve used for fluid flow shutoff, the solenoid valve including a coil, a body provided with a valve seat, and a mobile core loaded by a return spring and presenting a valving member formed from an elastomer and arranged to cooperate with the valve seat of said body, the method comprising the steps of:

sensing the commencement of movement of the mobile core at the beginning of its closure stroke; and then applying a braking force to the mobile core such that the energy involved in the impact between the valving member and the mobile core seat is reduced.

8. The method as claimed in claim 7, further comprising the steps of:

delaying a predetermined period after the sensing the commencement of movement of the mobile core during its closure stroke before applying the braking force.

9. The method as claimed in claim 7, further wherein the braking force is applied to the mobile core for a predetermined limited duration.

* * * * *